United States Patent [19]

Maeda

[11] Patent Number: 5,084,858
[45] Date of Patent: Jan. 28, 1992

[54] REPRODUCING APPARATUS HAVING AN ARITHMETIC CIRCUIT TO LINEARLY COMBINE AN INVERSE MATRIX OF CROSSTALK RATIOS RELATIVE TO THE ADJACENT TRACKS AND SIGNALS READ FROM THE ADJACENT AND TRACED TRACKS

[75] Inventor: Takanori Maeda, Tokorozawa, Japan

[73] Assignee: Pioneer Electronic Corporation, Tokyo, Japan

[21] Appl. No.: 526,746

[22] Filed: May 22, 1990

[30] Foreign Application Priority Data

May 29, 1989 [JP] Japan .................. 1-135565

[51] Int. Cl.[5] .............................................. G11B 7/00
[52] U.S. Cl. .................... 369/124; 369/44.41
[58] Field of Search ............... 369/124, 54, 58, 100, 369/107, 111, 174, 175, 44.41; 358/310, 335, 328, 342

[56] References Cited

U.S. PATENT DOCUMENTS 4,489,351  12/1984  d'Alayer de Costemore d'Arc .................................. 358/335
4,520,401   5/1985  Takahashi et al. ................... 358/310
4,831,613   5/1989  Kanda ................................. 369/124

Primary Examiner—Robert L. Richardson
Assistant Examiner—Thai Tran
Attorney, Agent, or Firm—Sughrue, Mion, Zinn, Macpeak & Seas

[57] ABSTRACT

A recorded-information reading apparatus includes a pickup device for reading recorded signals from a recording medium. The read signals are supplied to a signal processing device for the purpose of signal processing. The signal processing device includes a memory device for storing the read signals for respective signal tracks on the recording medium. The stored data are supplied to an arithmetic device for the purpose of arithmetic processing. The arithmetic device uses the stored data to perform arithmetic operations for cancelling crosstalk components which come from the adjacent tracks to the signal read from a track which is being traced and then for estimating a true signal recorded on the track which is being traced. In this manner, the recorded-information reading apparatus eliminates the crosstalk components by processing the signals recorded on the recording medium without the need to use any special detecting mechanism.

5 Claims, 3 Drawing Sheets

REPRODUCING APPARATUS HAVING AN ARITHMETIC CIRCUIT TO LINEARLY COMBINE AN INVERSE MATRIX OF CROSSTALK RATIOS RELATIVE TO THE ADJACENT TRACKS AND SIGNALS READ FROM THE ADJACENT AND TRACED TRACKS

BACKGROUND OF THE INVENTION

1. Field of the Invention

The present invention relates to an apparatus for reading recorded information from a recording medium (for example, an optical disk) having a track for recording information.

2. Description of the Related Art

Optical disks such as laser vision disks have so-called track structures. In such a track structure, signals are recorded by forming a train of signal pits spirally from inner circumference to outer circumference of the optical disk. However, optical disks having the track structures encounter the problem of crosstalk in which the signal read from a track which is being traced contains the signals recorded on adjacent tracks. It is pointed out that the crosstalk is caused by the fact that a reading laser beam illuminates not only the track to be traced but also the adjacent tracks due to the relation between the spot diameter of the laser beam and the interval between adjacent tracks. As a result, the signals recorded on the tracks adjacent to the traced track are also read together with the signal recorded on the desired track.

To prevent such crosstalk, for example, two methods are known. The first method includes the steps of detecting the inclination of an optical pickup and correcting the position of the optical pickup so that it always correctly opposes the recording surface of an optical disk. The second method includes the steps of simultaneously read three adjacent tracks and performing subtraction using them.

The first method utilizes an arrangement in which a light emitted from a light emitting element and reflected by the optical disk, is received by two light receiving elements disposed adjacent to the light emitting element on opposite sides thereof. In the first method, the signal levels output from the respective light receiving elements are compared with each other by a differential amplifier to detect the inclination of the optical disk, thereby correcting the positions of the light emitting element and the light receiving elements with respect to the surface of the optical disk in accordance with the degree of inclination thereof. However, the first method has a number of problems. For example, a pickup having an excessively large size is needed because such an arrangement for detecting the inclination of the disk is provided independently of a device for reading information on the disk. Further, a part of the emitted light may not accurately fall on the optical disk in the outer circumferential portion thereof, with the result that no correct value is output.

The second method is disclosed in, for example, Japanese Patent Laid-Open No. 57/5824. The second method includes the steps of simultaneously reading three adjacent tracks and performing subtraction using the readout value. However, the second method still has a number of problems. A complicated pickup is needed, and since the signals read from adjacent tracks contain the same amount of crosstalk, it is only possible to improve recording density to such an extent that the crosstalk can be ignored.

SUMMARY OF THE INVENTION

It is an object of the present invention to provide an apparatus for reading recorded information, which can output a readout signal with reduced crosstalk by performing arithmetic operations utilizing information read from a plurality of tracks.

To achieve the above object, according to the present invention, there is provided a recorded-information reading apparatus comprising a pickup device for reading a signal which is recorded a recording medium in the form of a track and a signal processing device for processing the read signal. The signal processing device comprises memory means for storing a signal read from a track which is being traced and signals read from a plurality of tracks adjacent to the aforesaid track, and arithmetic means arranged to receive the data stored in the memory means, obtain as a coupling coefficient from the inverses of the values of the signals read from the adjacent tracks, perform arithmetic operations on a linear combination of the coupling coefficient and the signal read from the track which is being traced, and output an estimated-value signal corresponding to the signal recorded on the track which is being traced.

In accordance with the present invention, the memory means stores the signal read from a track which is being traced and the signals read from a plurality of tracks adjacent to the track to be traced. The individual stored readout signals are supplied to the arithmetic means which perform estimation operations as to the signal recorded on the track to be traced. These estimation operations are performed by carrying out arithmetic operations for obtaining a linear combination of the track readout signal and a coupling coefficient which is derived from the adjacent-track readout signals.

More specifically, during the process in which the pickup reads signals from the recording medium, the track readout signal contains crosstalk components derived from the signal components recorded on the adjacent tracks. This indicates that the track readout signal is given by the product of the track recorded signal and the crosstalk components. Accordingly, a true recorded signal, which is contained in the track readout signal, can be estimated by performing arithmetic operations for obtaining a linear combination of the track readout signal and the coupling coefficient which is derived from the inverses of the crosstalk components.

In accordance with the present invention, it is possible to select on the information recorded on the track to be traced of a recording medium having a track structure. Accordingly, as compared with the conventional arrangement, it is possible to obtain a high-quality signal with reduced crosstalk, whereby recording density can be improved. In addition, although it has heretofore been necessary to incorporate a complicated arrangement for inclining the pickup itself, the present invention makes it possible to produce a high-performance pickup having a simple arrangement which does not need such a complicated arrangement. If the complicated arrangement may be employed, it will be possible to provide a pickup having performance superior to that of the conventional equivalent arrangement.

Further objects, features and advantages of the present invention will become apparent from the following detailed description of the present invention with reference to the accompanying drawings.

DESCRIPTION OF THE PREFERRED EMBODIMENT

A preferred embodiment of the present invention will be described below with reference to the accompanying drawings.

Figure 1:
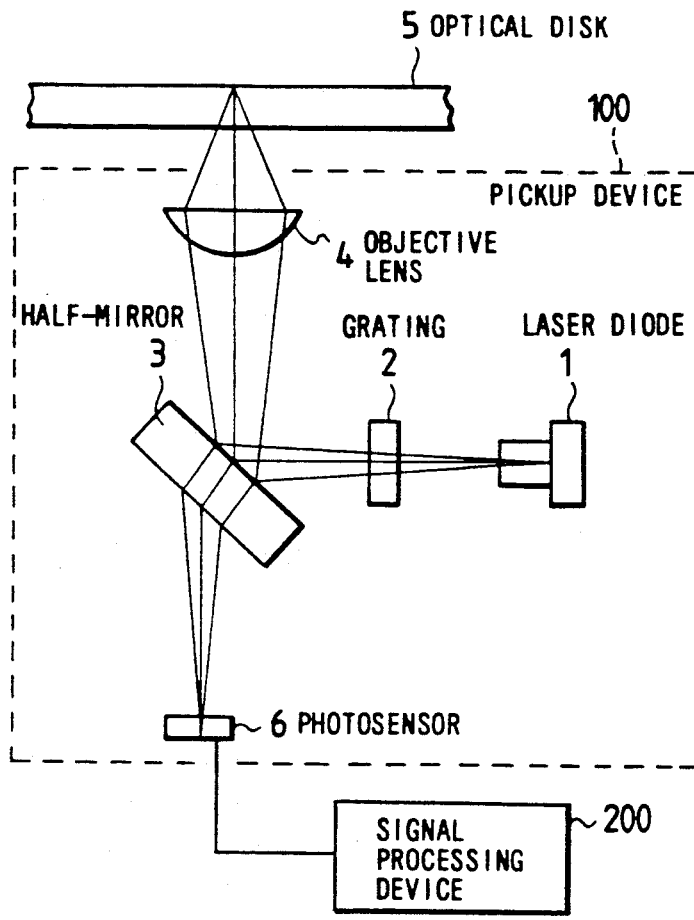
FIG. 1 is a block diagram showing the layout of an embodiment of the present invention.
Figure 5:
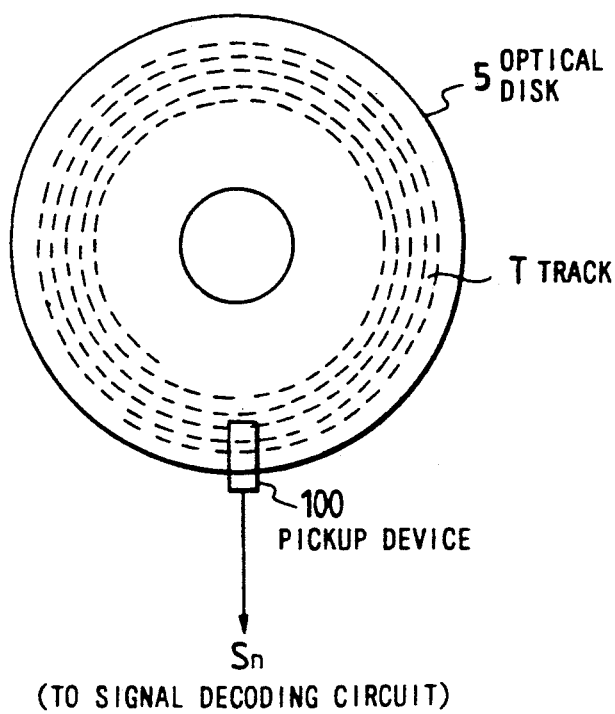
FIG. 5 is a schematic plan view showing an optical disk.

FIG. 1 is a schematic diagram showing the layout of an apparatus for reading recorded information according to the embodiment of the present invention. As shown in FIG. 1, the apparatus for reading recorded information generally comprises a pickup device 100 for optically reading signals recorded on an optical disk 5, such as a laser vision disk, and a signal processing device 200 for effecting signal processing of the read signal. As shown in FIG. 5, the optical disk 5 such as a laser vision disk has a so-called track structure in which signals are recorded by forming a train of signal pits spirally from the inner circumference to the outer circumference of the optical disk 5.

In the pickup device 100, laser light, emitted by a light emitting device 1 such as a laser diode or the like, passes through a grating (diffraction grating) 2 and is directed to an objective lens 4 by a half-mirror 3. The objective lens 4 focuses the incident laser light to form a beam spot 7 (FIG. 2) on the optical disk 5. The beam spot 7 is modulated in accordance with the signal recorded on the track being traced (target track) and the signals recorded on adjacent tracks on the optical disk 5. The modulated laser light is transmitted through the objective lens 4 and the half-mirror 3 and is then incident upon a photosensor 6. The fact that the beam spot 7 is modulated by the signals recorded on the adjacent tracks means that the laser light which illuminates the track being traced reads not only the track being traced but the adjacent tracks, thereby causing crosstalk. The signals thus read are subjected to photoconversion in the photosensor 6 and supplied to a signal processing device 200.

Figure 3:
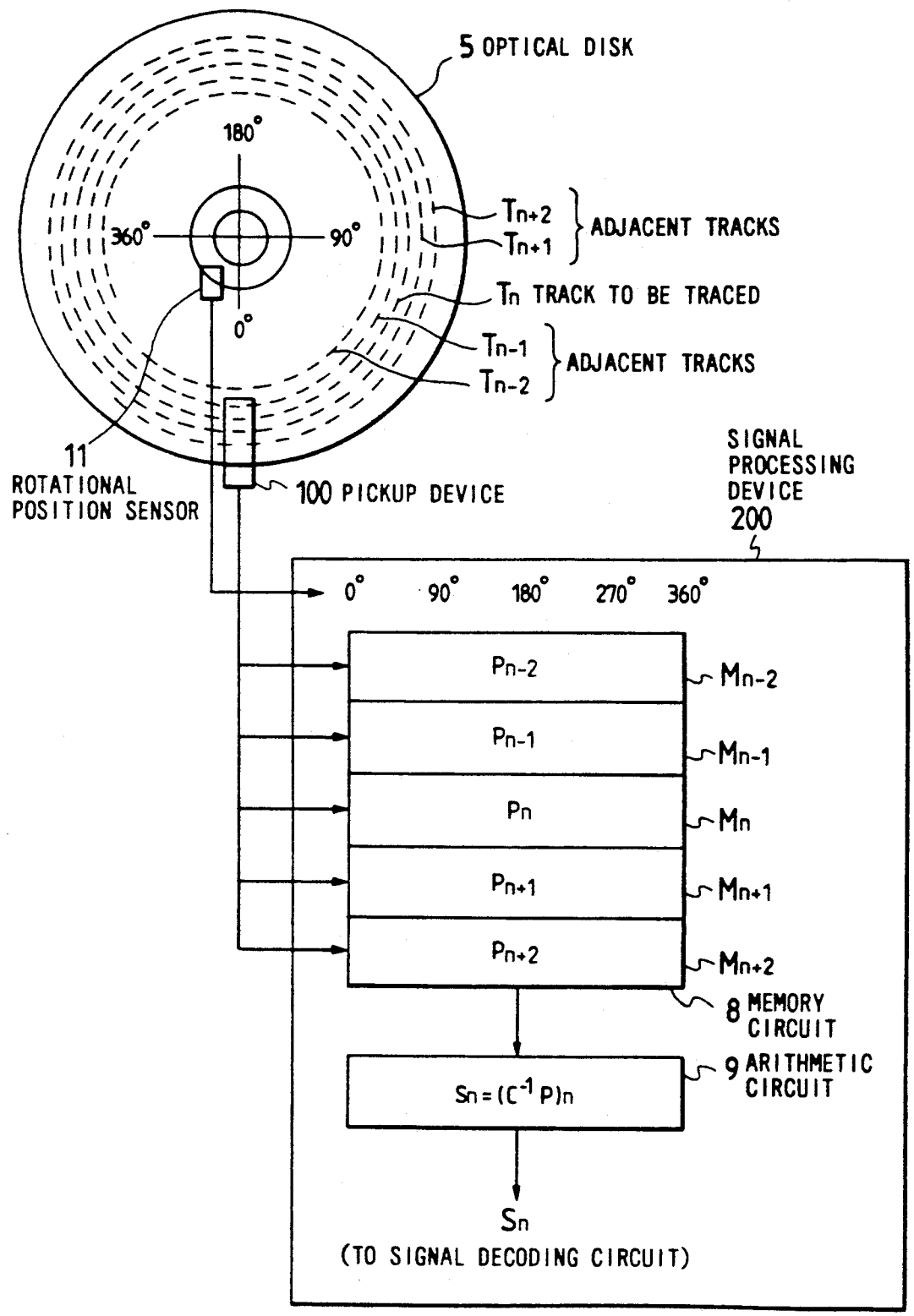
FIG. 3 is a block diagram showing the embodiment of the present invention.

As shown in FIG. 3, the signal processing device 200 comprises a rotational position sensor 11 for detecting the angle of the optical disk 5 in the direction of rotation, a memory circuit 8 for storing the read signals supplied from the photosensor 11, and an arithmetic circuit 9 for performing estimation operations on the signal recorded on the track being traced on the basis on the stored readout data.

Figure 2:
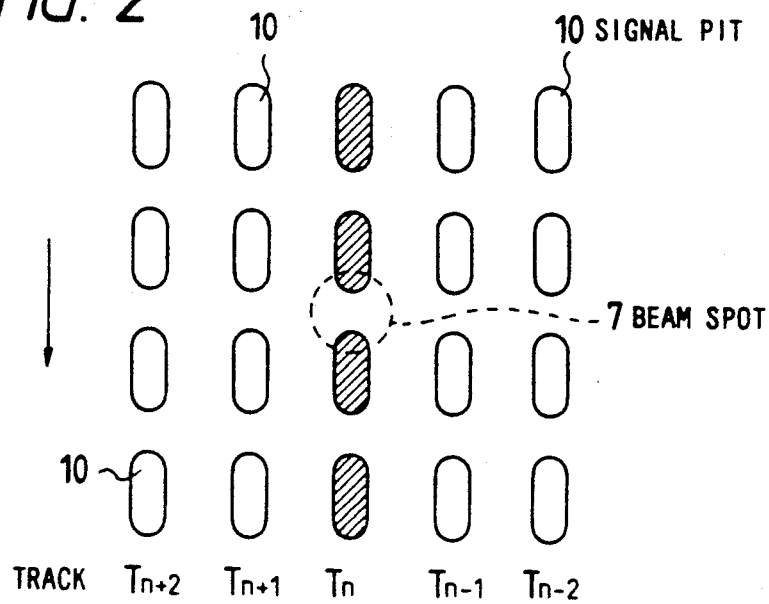
FIG. 2 is a fragmentary enlarged view showing tracks.

The memory circuit 8 may be constructed utilizing a memory device, such as a RAM (random access memory), of the type which allows writing and reading of data. The memory circuit 8 has a plurality of memory areas corresponding to a plurality of readout signals. In the present embodiment, as shown in FIG. 2, the memory circuit 8 has memory areas $M_{n-2}$, $M_{n-1}$, $M_n$, $M_{n+1}$ and $M_{n+2}$ for storing corresponding data $P_{n-2}$, $P_{n-1}$, $P_n$, $P_{n+1}$ and $P_{n+2}$. The data $P_{n-2}$ and $P_{n-1}$ are read from tracks $T_{n-2}$ and $T_{n-1}$ adjacent to a track to be traced $T_n$ on the inner-circumferential side. The data $P_n$ is read from the desired track $T_n$, and the data $P_{n+1}$ and $P_{n+2}$ are read from the tracks $T_{n+2}$ and $T_{n+1}$ adjacent to the track to be traced $T_n$ on the outer-circumferential side. Although the present embodiment handles five kinds of stored data for the purpose of illustration, the number of kinds of data is not limited to such a specific number. Although it is generally preferable to use a plurality of kinds of data, in practice, three to five kinds of data may preferably be used by taking into account the memory capacity and calculation accuracy of the memory circuit 8. Resolution in the circumferential direction is selected to a degree higher than or equal to a frequency which allows signals to be recorded and reproduced around the outer circumference of the disk. In FIG. 2, each signal pit is denoted by reference numeral 10.

The arithmetic circuit 9 may be constructed utilizing a microprocessor or the like, and performs arithmetic operations represented by the following equation in accordance with the program stored in the arithmetic circuit 9:

$$S' = C^{-1} \cdot P$$

where

S': vector of the signal recorded on the track to be traced (estimated value)

S: vector of the signal recorded on the track to be traced (true value)

C: vector of a crosstalk component from each adjacent track $C^{-1}$: inverse matrix (coupling coefficient) of C P: vector of the readout signal The following is an explanation of the operation of the present embodiment.

A signal Sn is recorded on the track to be traced Tn on the optical disk 5 and the signal Sn constitutes an component of the vector S. The vector S is hereinafter reffered to as a "recorded-signal vector S". The readout signal Pn is obtained by tracing the track Tn, and the readout signal Pn constitutes an component of the vector P. The vector P is hereinafter referred to as a "readout-signal vector P". With respect to the readout-signal vector P, the crosstalk ratio relative to the adjacent tracks $T_{n+1}$ and $T_{n+2}$ is denoted by R and the crosstalk ratio relative to the adjacent tracks $T_{n-1}$ and $T_{n-2}$ is denoted by L. If it is assumed that k tracks are formed on the optical disk 5, the readout-signal vector P and the recorded-signal vector S have the following relation:

$$P = C \times S \qquad (1)$$

where C is a matrix representing the crosstalk. The vectors P and S whose components are the signal levels of respective tracks positioned on the same radius, are associated with each other through the matrix C. The term "vector" means a matrix of k rows and one column, which has the k signals as components, but does not indicate any position in space. The above equation is represented by using the components as follows:

$$\begin{bmatrix} P_1 \\ P_2 \\ \vdots \\ P_{n-2} \\ P_{n-1} \\ P_n \\ P_{n+1} \\ P_{n+2} \\ \vdots \\ P_{k-1} \\ P_k \end{bmatrix} = \begin{bmatrix} 1R00\ldots\ldots 0 \\ L1R0\ldots\ldots 0 \\ \vdots \\ 0.L1R0\ldots.0 \\ 0.0L1R0\ldots 0 \\ 0\ldots 0L1R0\ldots 0 \\ 0\ldots 0L1R0.0 \\ 0\ldots\ldots 0L1R.0 \\ \vdots \\ 0\ldots\ldots 0L1R \\ 0\ldots\ldots 0L1 \end{bmatrix} \times \begin{bmatrix} S_1 \\ S_2 \\ \vdots \\ S_{n-2} \\ S_{n-1} \\ S_n \\ S_{n+1} \\ S_{n+2} \\ \vdots \\ S_{k-1} \\ S_k \end{bmatrix}$$

Therefore, the estimated value S' of the recorded signal is obtained from the readout signal P by the following equation:

$$S' = C^{-1} \times P \tag{3}$$

The recorded signal S on the optical disk 5 can be obtained from the estimated value S'. In the above explanation, $C^{-1}$ represents the inverse matrix of C.

However, it is not practical that all the signals on the k tracks are used for calculation. Accordingly, if a matrix relative to the aforementioned five tracks is obtained and the component of $S_n'$ only is taken out, the following equation is obtained:

$$S_n' = ((L^2 - L^3 R)P_{n-2} + (L^2 R - L)P_{n-1} + (1 - 2LR + L^2 R^2)P_n + (LR^2 - R)P_{n+1} + (R^2 - LR^3)P_{n+2})/(1 - 4LR + 3L^2 R^2) \tag{4}$$

Moreover, since higher-order terms of L and R show smaller values, these terms may be ignored for the sake of simplicity. For example, if the terms to the third power or above are ignored, Equation (4) can be simplified as follows:

$$S_n' = (L^2 P_{n-2} - LP_{n-1} + P_n - RP_{n+1} + R^2 P_{n+2})/(1 - 4LR) \tag{5}$$

If the terms to the second power or above are ignored, the equation can be further simplified as follows:

$$S_n' = -LP_{n-1} + P_n - RP_{n+1} \tag{6}$$

This corresponds to the result obtained when a crosstalk matrix of 3 rows×3 columns was initially extracted. In practice, it is not necessary to calculate the constant term "(1−4LR)" which serves as a denominator in the above example.

To confirm the result, if Equation (2) is substituted for the readout signal vector P in each of Equations (4), (5) and (6), the following equations are obtained.

For Equation (4), $$S_n' = ((L^3 - L^4 R)S_{n-3} + (1 - 4LR + 3L^2 R^2)S_n + (R^3 - RL^4)S_{n+3})/(1 - 4LR + 3L^2 R^2) \tag{7}$$

For Equation (5), $$S_n' = (L^3 S_{n-3} + L^2 RS_{n-1} + (1 - 2LR)S_n + LR^2 S_{n+1} + R^3 S_{n+3})/(1 - 4LR) \tag{8}$$

For Equation (6), $$S_n' = -L^2 S_{n-2} + (1 - 2LR)S_n - R^2 S_{n+2} \tag{9}$$

If the embodiment is compared with the conventional arrangement:

$$S_n' = P_n = LS_{n-1} + S_n + RS_{n+1} \tag{10}$$

the amount of crosstalk β is as follows. For the sake of simplicity, it is assumed that the crosstalk ratios L, R and α are the same and that the signal intensity of each track is the same.

β = (the intensity of the components other than $S_n$ which is contained in $S_n'$)/(the intensity of the $S_n$ component which is contained in $S_n'$), for the conventional arrangement $$\beta_0 = 2\alpha \tag{11}$$

for Equation (6), $$\beta_1 = 2\alpha/(1 - 2\alpha^2) \tag{12}$$

for Equation (5), $$\beta_2 = 4\alpha^3/(1 - 2\alpha^2) \tag{13}$$

For Equation (4)

$$\beta_3 = 2(\alpha^3 - \alpha^5)/(1 - 4\alpha^2 + 3\alpha^4) \tag{14}$$

The result will be numerically confirmed. For example, for α=0.005, $\beta_0 = -40$dB, $\beta_1 = -86$dB, $\beta_2 = -126$dB, and $\beta_3 = -132$dB, whereby an improvement of 46dB-92dB is achieved compared to the conventional system. For α=0.1, $\beta_0$ becomes equal to −14dB, that is, a value which indicates that no normal signal is read out. However, $\beta_1 = -33$dB, $\beta_2 = -48$dB, and $\beta_3 = -53$dB are obtained, whereby an improvement of 19dB-39dB is achieved to enable reliable reproduction of a signal.

Figure 4:
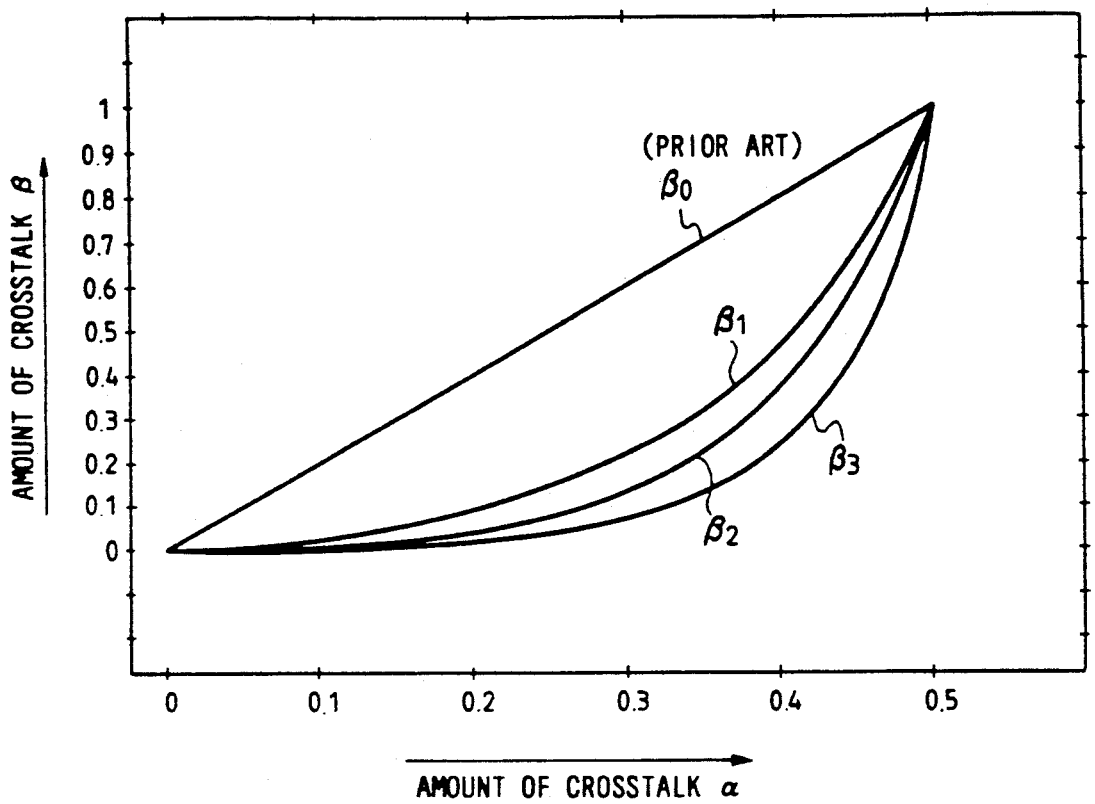
FIG. 4 is a graphic representation showing a comparison between the amount of crosstalk in the present invention and the amount of crosstalk in a conventional arrangement.

FIG. 4 is a graphic representation in which the amounts of crosstalk $\beta_1$, $\beta_2$ and $\beta_3$ are each plotted with respect to the amount of crosstalk α. As can be seen from FIG. 4, as the amount of crosstalk α is increased, recording density can be improved with respect to the same pickup. Event if the recording density is the same, it is possible to use a pickup which is inferior in light pickup (condense) performance, whereby production of pickups is facilitated.

The amount α of crosstalk is substantially determined by the standards and design of the optical disk 5. If the values of the crosstalk ratios L and R differ from each other, it is possible to estimate the crosstalk ratios L and R from the output from a known inclination angle detector for detecting the inclination angle of the optical disk 5 by utilizing the property that the crosstalk ratios R and L accurately correspond to the angle of inclination of the optical disk 5. Otherwise, means for directly measuring the amount of crosstalk may be provided so that calculations are performed on the basis of the measurement result.

Although the above embodiment has been explained with reference to the optical disk as a specific example, the present invention can be similarly applied to a recording medium of any other type that has a track structure, such as an optical card, a magnetic recording medium or the like. Although the above explanation refers to the case where the influence of three to five tracks is taken into account, it is likewise possible to handle the influence of far more tracks.

In addition, the memory circuit 8 may utilize various kinds of memory devices such as semiconductor memory devices, optical memories or the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for reading recorded information comprising:

a pickup device for reading a signal which is recorded on a recording medium in the form of a track; and a signal processing device for processing said read signal, said signal processing device comprising:

memory means for storing a signal read from a track which is being traced and signals read from a plurality of tracks adjacent to said traced track; and arithmetic means for receiving data stored in said memory means, for obtaining a coupling coefficient, which represents an inverse matrix of crosstalk ratios relative to the adjacent tracks, and for performing arithmetic operations on a linear combination of said coupling coefficient and the signals read from said adjacent and traced tracks, said arithmetic means outputting an estimated-value signal corresponding to said signal recorded on said traced track.

2. An apparatus according to claim 1, wherein said pickup device is an optical pickup device arranged to read a recorded signal by focusing a laser beam on the signal-recorded surface of said recording medium and detecting a laser beam reflected from said signal-recorded surface.

3. An apparatus according to claim 1, wherein said adjacent tracks, which are used to obtain said coupling coefficient by said arithmetic means, include at least a track which is traced one track before the track which is being traced and a track which is traced one track after the track which is being traced.

4. The apparatus of claim 1, wherein each of said signals read from the traced and adjacent tracks substantially correspond to different tracks.

5. The apparatus of claim 1, wherein the signals read from the traced and adjacent tracks are read along a radial line of said recording medium.

* * * * *